(12) United States Patent
Balakrishnan et al.

(10) Patent No.: US 10,825,042 B1
(45) Date of Patent: Nov. 3, 2020

(54) SYSTEMS AND METHODS FOR PROVIDING OPTIMIZED LEADING MESSAGES

(71) Applicant: Groupon, Inc., Chicago, IL (US)

(72) Inventors: Raju Balakrishnan, Mountain View, CA (US); Rajesh Girish Parekh, San Jose, CA (US)

(73) Assignee: Groupon, Inc., Chicago, IL (US)

( * ) Notice: Subject to any disclaimer, the term of this patent is extended or adjusted under 35 U.S.C. 154(b) by 457 days.

(21) Appl. No.: 14/039,697

(22) Filed: Sep. 27, 2013

(51) Int. Cl.
*G06Q 30/02* (2012.01)

(52) U.S. Cl.
CPC .................. *G06Q 30/0246* (2013.01)

(58) Field of Classification Search
CPC .................................................. G06Q 30/0246
USPC ...................................................... 705/14.43
See application file for complete search history.

(56) References Cited

U.S. PATENT DOCUMENTS

| | | | | |
|---|---|---|---|---|
| 8,504,550 B2* | 8/2013 | Hall | ........................ | H04L 51/32 707/710 |
| 9,356,889 B2* | 5/2016 | Caskey | .................... | H04L 51/22 |
| 2007/0150344 A1* | 6/2007 | Sobotka | .................. | G06Q 30/02 705/14.43 |
| 2008/0052152 A1* | 2/2008 | Yufik | ...................... | G06Q 30/02 705/14.34 |
| 2011/0066496 A1* | 3/2011 | Zhang | ................ | G06F 17/30867 705/14.53 |
| 2015/0019334 A1* | 1/2015 | Moses | ................. | G06Q 30/0256 705/14.54 |

\* cited by examiner

*Primary Examiner* — Azam A Ansari
(74) *Attorney, Agent, or Firm* — Alston & Bird LLP

(57) ABSTRACT

Systems, apparatus, methods, and computer program products are provided for optimized and effective leading messages, which may be an email subject that may provoke a consumer to access the body portion of an email message. A system may include circuitry configured to programmatically determine a predicted access rate for a leading message when the leading message is provided as a portion of a promotional message. Circuitry may be configured to track historical data indicating the access rates of leading messages and/or leading message terms. The circuitry may be configured to leverage the historical data to determine predicted access rates for leading messages, such as based at least in part on historical access rates associated with one or more leading message terms of the leading message.

25 Claims, 8 Drawing Sheets

SYSTEMS AND METHODS FOR PROVIDING OPTIMIZED LEADING MESSAGES

FIELD

Embodiments of the invention relate, generally, to techniques for providing messages to consumers.

BACKGROUND

Via electronic networks (e.g., the Internet), promotional systems provide promotional messages to consumer devices. One example of a promotional message is email. The email subject provides a key first impressionistic effect upon the decision of the consumer to open the email or otherwise read the additional content therein. In this regard, improved systems for providing messages to consumers are desirable.

BRIEF SUMMARY

Through applied effort, ingenuity, and innovation, solutions to improve such systems have been realized and are described herein. Methods, systems, apparatus, and non-transitory computer program products described herein may be operable to provide impressions including leading messages to consumers. Some embodiments may provide for a system configured to provide impressions to consumers including effective leading messages. For example, the system may include circuitry configured to: receive a leading message including one or more leading message terms; determine an access rate score for a first leading message term based on historical data indicating frequencies at which consumers accessed impressions including leading message terms; and determine a predicted access rate for the leading message based on the access rate score for at least the first of the leading message term.

In some embodiments, the leading message may be an email subject. The impressions may include emails each indicating one or more promotions. The predicted access rate for the leading message may indicate a rate at which consumers are predicted to open an email including the leading message as the email subject.

In some embodiments, the circuitry configured to determine the access rate score for the first leading message term based on the historical data may include the circuitry being configured to determine a frequency at which consumers accessed impressions including the first leading message term.

In some embodiments, the circuitry configured to determine the access rate score for the first leading message term based on the historical data further includes the circuitry being configured to: determine one or more related leading message terms related to the first leading message term; determine, based on the historical data, an access rate score for each of the one or more related leading message terms; and determine an estimated access rate score for the first leading message term as the access rate score for the first leading message term based on the access rate score for each of the one or more related leading message terms.

For example, the circuitry configured to determine the one or more related leading message terms related to the first leading message term may include the circuitry being configured to: determine that the first leading message term is different from the leading message terms indicated by the historical data; determine a similarity score (e.g., based on edit distance) between the first leading message term and the leading message terms of the historical data; and determine the one or more related leading message terms based the similarity score between the first leading message term and the leading message terms indicated by the historical data.

In some embodiments, the circuitry configured to determine the predicted access rate for the leading message may include the circuitry being configured to: determine an access rate score for a second leading message term based on historical data indicating frequencies at which consumers accessed impressions including at least the second leading message term; and determine the predicted access rate for the leading message based on the access rate score for the first leading message term and the access rate score for the second leading message term.

In some embodiments, the circuitry configured to determine the predicted access rate for the leading message may include the circuitry being configured to determine the predicted access rate based at least in part on leading message metadata of the leading message and/or leading message metadata of the historical data.

In some embodiments, the circuitry configured to determine the access rate score for the first leading message term based on the historical data may include the circuitry being configured to: determine a first frequency at which consumers accessed impressions including the first leading message term and not including a second leading message term of the leading message; determine a second frequency at which consumers accessed impressions including the second leading message term and not including the first leading message term; determine an attribution score for the first leading message term based at least in part on the first and second frequencies; and determine the access rate score for the first leading message term based at least in part on the attribution score.

In some embodiments, the circuitry configured to determine the access rate score for the first leading message term based on the historical data may include the circuitry being configured to: determine an average access rate for the first leading message term; determine a first number of impressions including the first leading message term that resulted in an access rate greater than the average access rate; determine a second number of impressions including the first leading message term that resulted in an access rate less than the average access rate; determine an occurrence count for the first leading message term based on a difference between the first number of impressions and the second number of impressions; and determine the access rate score for the first leading message term based at least in part on the occurrence count.

In some embodiments, the circuitry may be further configured to provide an impression to a consumer device. The impression may include leading message that further includes the first leading message term and a trailing impression portion. The circuitry may be further configured to: receive access data from the consumer device indicating that trailing impression portion has been accessed; and generate, based on the received access data, the historical data indicating a frequency at which consumers accessed the trailing impression portion for impressions including the first leading message term.

In some embodiments, the circuitry may be further configured to recommended leading message term as a substitute for the first leading message term. A recommended predicted access rate for the leading message including the recommended leading message term may be higher than the predicated access rate for the leading message including the first leading message term.

Some embodiments may provide for a machine-implemented method for programmatically providing effective leading messages. The method may include: receiving, by processing circuitry, a leading message including one or more leading message terms; determining, by the processing circuitry, an access rate score for a first leading message term based on historical data indicating frequencies at which consumers accessed impressions including leading message terms; accessing the historical data from a non-transitory memory; and determining, by the processing circuitry, a predicted access rate for the leading message based on the access rate score for at least the first of the leading message term.

In some embodiments, the leading message may be an email subject. The impressions may include emails each indicating one or more promotions. The predicted access rate for the leading message may indicate a rate at which consumers are predicted to open an email including the leading message as the email subject.

In some embodiments, determining the access rate score for the first leading message term based on the historical data may include determining a frequency at which consumers accessed impressions including the first leading message term.

In some embodiments, determining the access rate score for the first leading message term based on the historical data may include: determining one or more related leading message terms related to the first leading message term; determining, based on the historical data, an access rate score for each of the one or more related leading message terms; and determining an estimated access rate score for the first leading message term as the access rate score for the first leading message term based on the access rate score for each of the one or more related leading message terms.

In some embodiments, determining the one or more related leading message terms related to the first leading message term may include: determining that the first leading message term is different from the leading message terms indicated by the historical data; determining a similarity score between the first leading message term and one or more leading message terms of the historical data; and determining the one or more related leading message terms based the similarity score between the first leading message term and the leading message terms indicated by the historical data.

In some embodiments, determining the predicted access rate for the leading message further may include: determining an access rate score for a second leading message term based on historical data indicating frequencies at which consumers accessed impressions including at least the second leading message term; and determining the predicted access rate for the leading message based on the access rate score for the first leading message term and the access rate score for the second leading message term. In some embodiments, determining the predicted access rate for the leading message further may include determining the predicted access rate based at least in part on leading message metadata of the leading message.

In some embodiments, determining the access rate score for the first leading message term based on the historical data may include: determining a first frequency at which consumers accessed impressions including the first leading message term and not including a second leading message term of the leading message; determining a second frequency at which consumers accessed impressions including the second leading message term and not including the first leading message term; determining an attribution score for the first leading message term based at least in part on the first and second frequencies; and determining the access rate score for the first leading message term based at least in part on the attribution score.

In some embodiments, determining the access rate score for the first leading message term based on the historical data may include: determining an average access rate for the first leading message term; determining a first number of impressions including the first leading message term that resulted in an access rate greater than the average access rate; determining a second number of impressions including the first leading message term that resulted in an access rate less than the average access rate; determining an occurrence count for the first leading message term based on a difference between the first number of impressions and the second number of impressions; and determining the access rate score for the first leading message term based at least in part on the occurrence count.

In some embodiments, the method may further include providing an impression to a consumer device. The impression may include a leading message that further includes the first leading message term and a trailing impression portion. The method may further include: receiving access data from the consumer device indicating that trailing impression portion has been accessed; and generating, by the processing circuitry and based on the received access data, the historical data indicating a frequency at which consumers accessed the trailing impression portion for impressions including the first leading message term.

In some embodiments, the method may further include providing a recommended leading message term as a substitute for the first leading message term. Here, a recommended predicted access rate for the leading message including the recommended leading message term may be higher than the predicated access rate for the leading message including the first leading message term.

Some embodiments may include circuitry and/or media configured to implement the methods and/or other functionality discussed herein. For example, one or more processors, and/or other machine components may be configured to implement the functionality discussed herein based on instructions and/or other data stored in memory and/or other non-transitory computer readable media.

These characteristics as well as additional features, functions, and details of various embodiments are described below. Similarly, corresponding and additional embodiments are also described below.

BRIEF DESCRIPTION OF THE DRAWINGS

Figure 1:
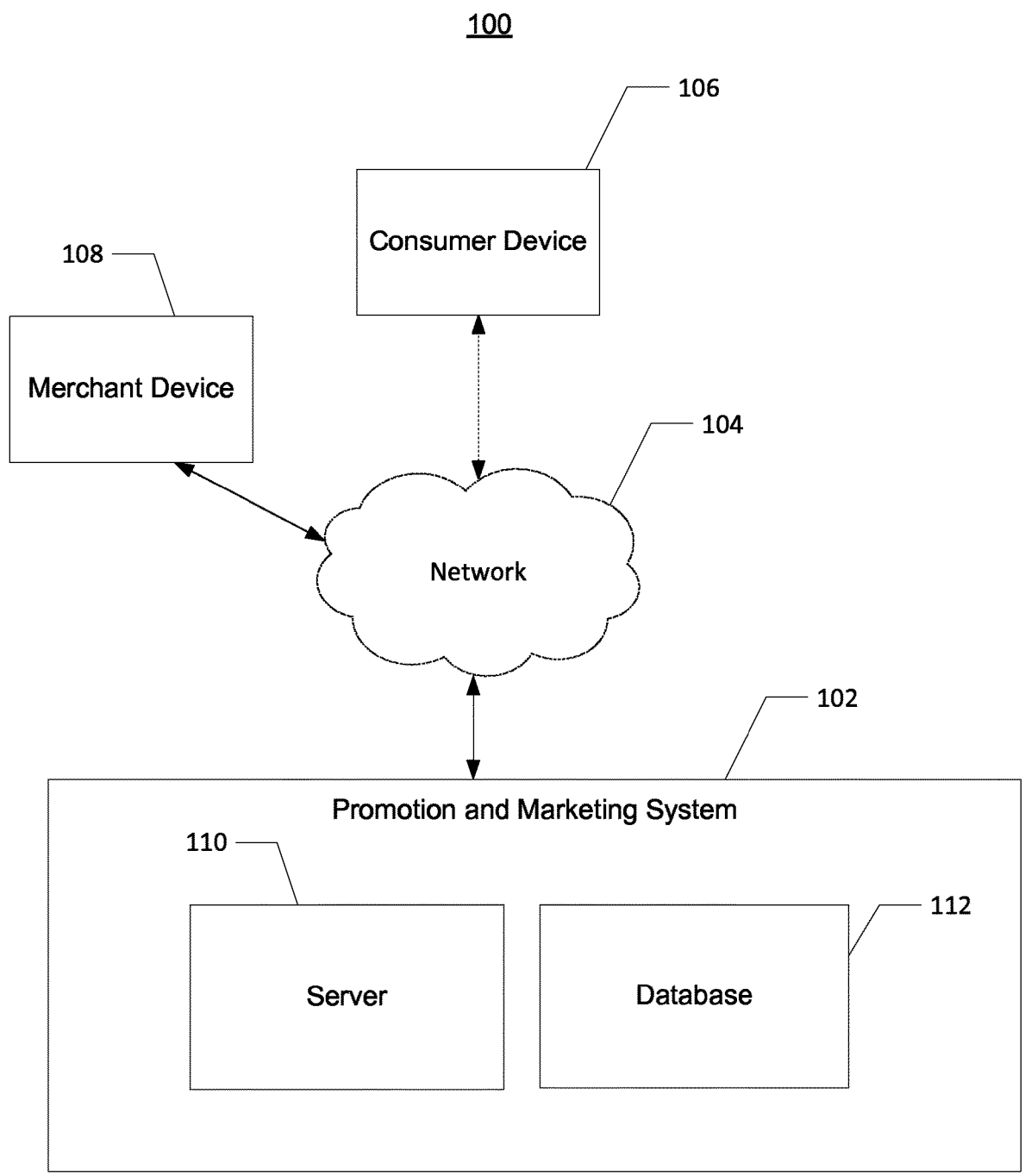
Figure 2:
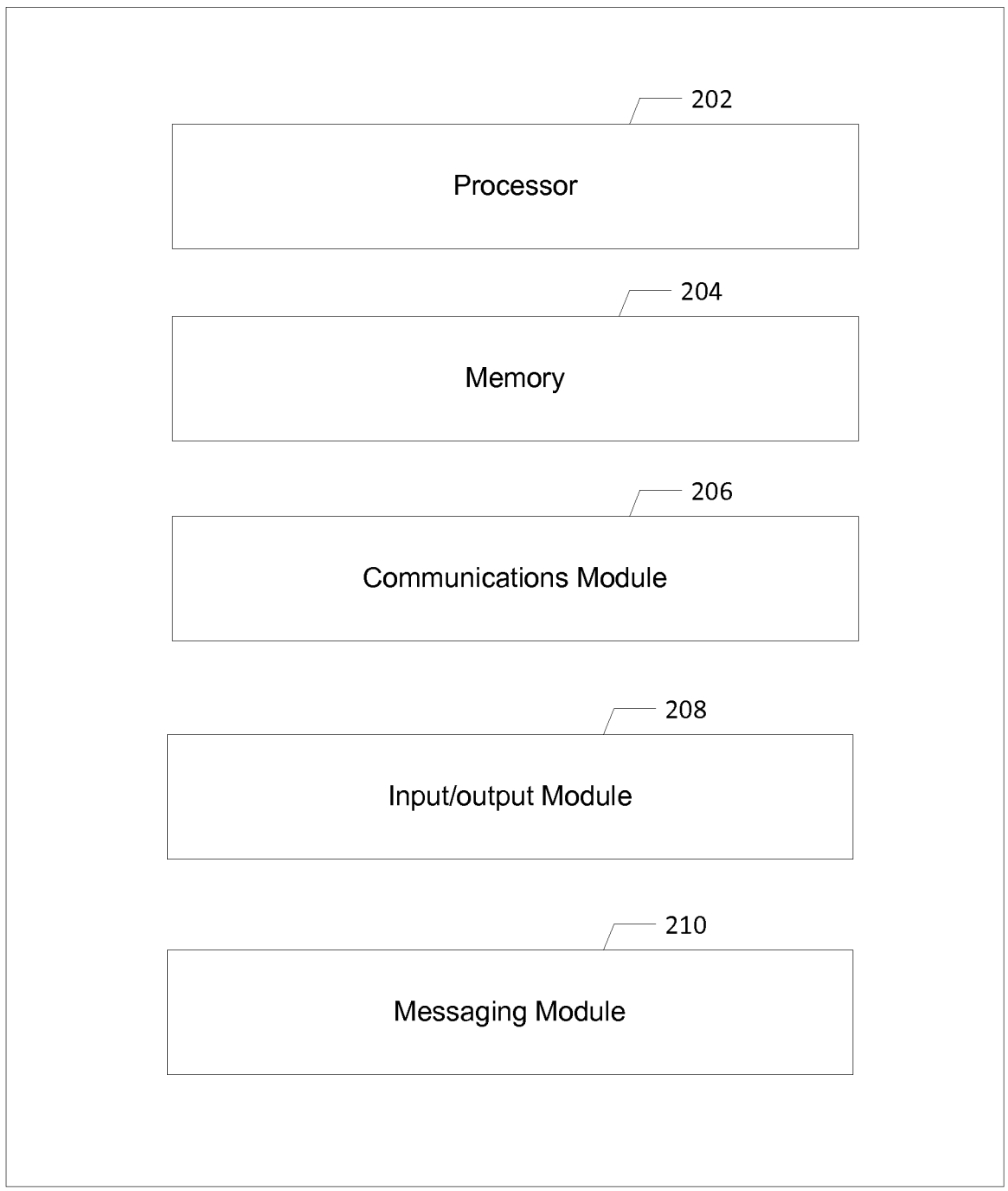
Figure 3:
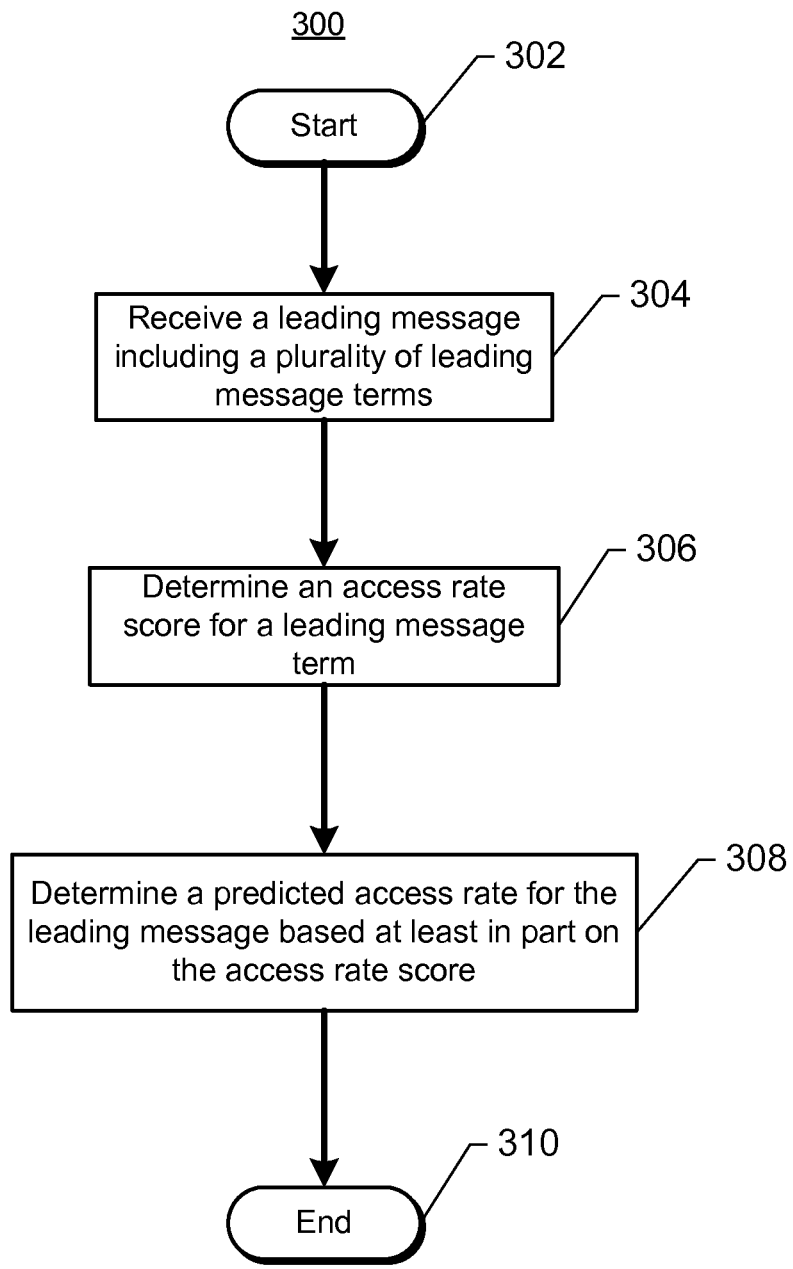
Figure 4:
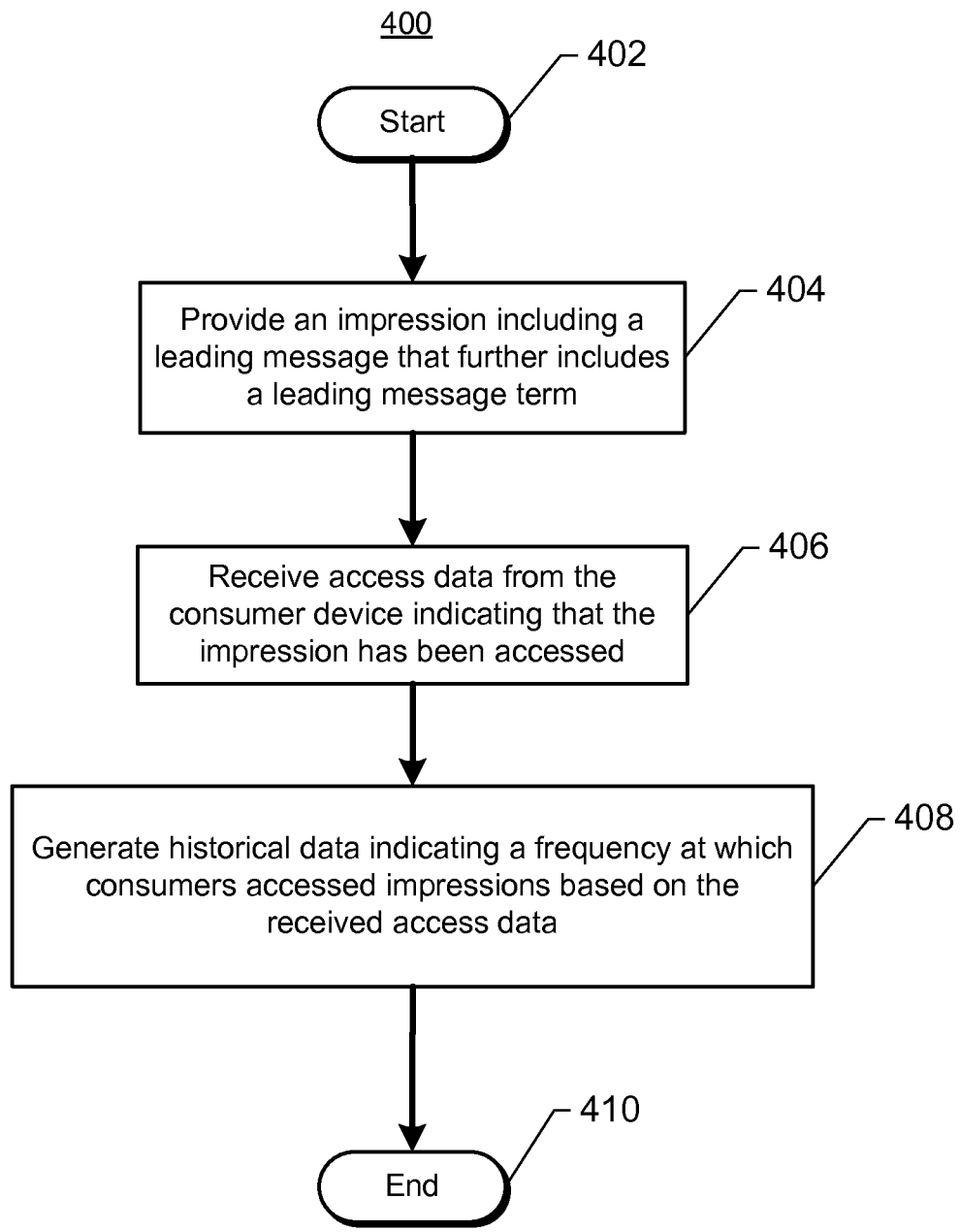
Figure 5:
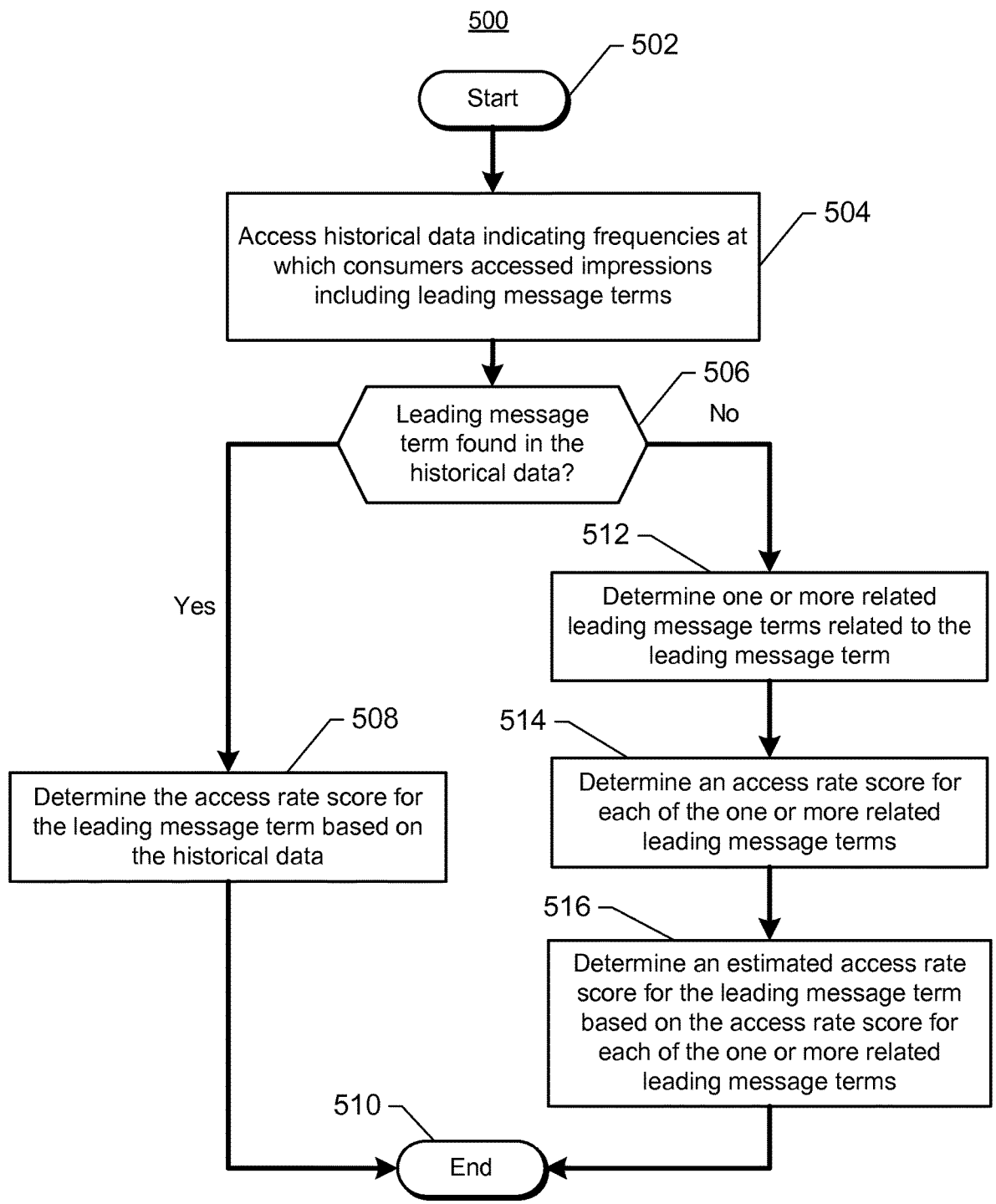
Figure 6:
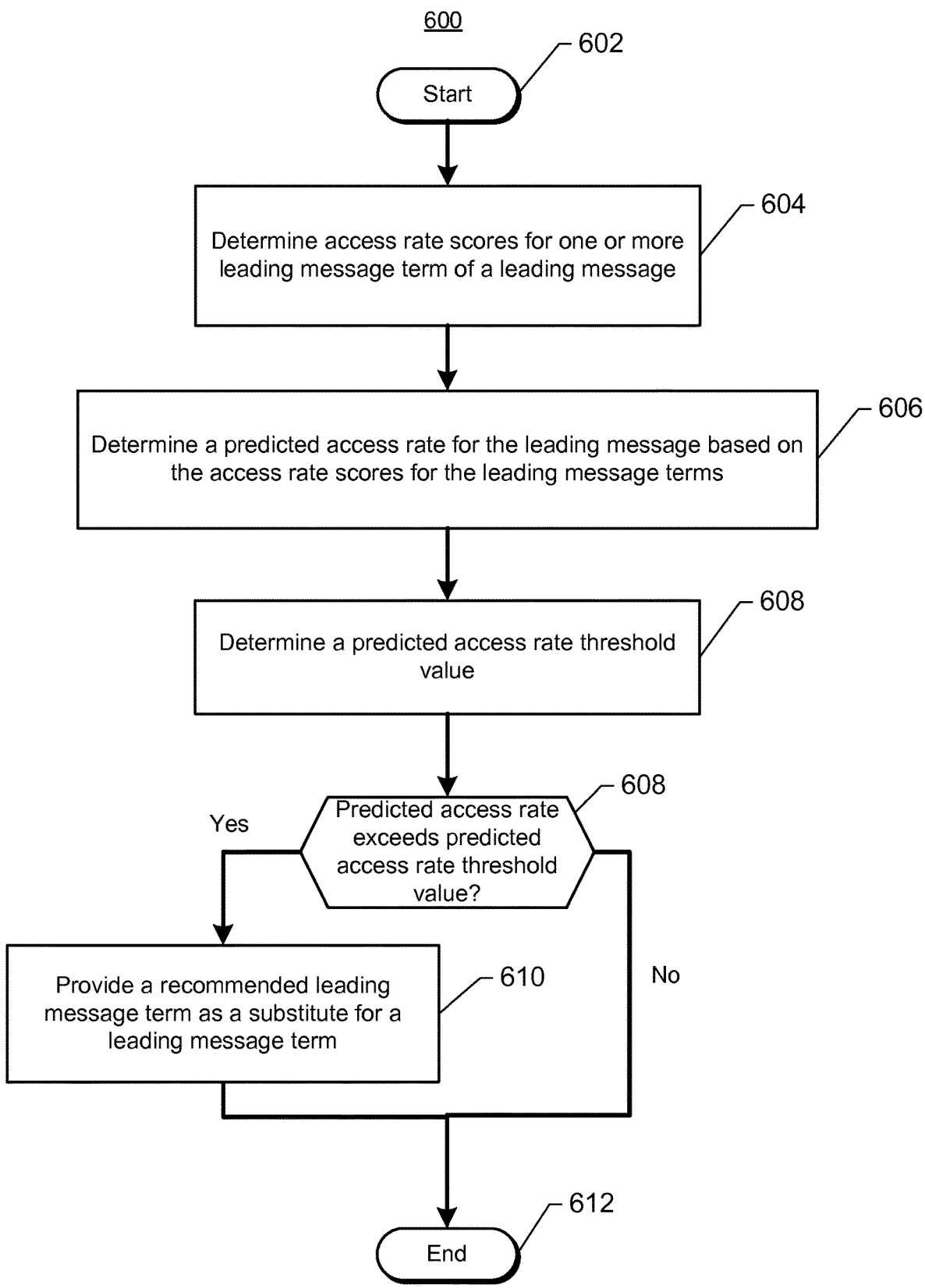
Figure 7:
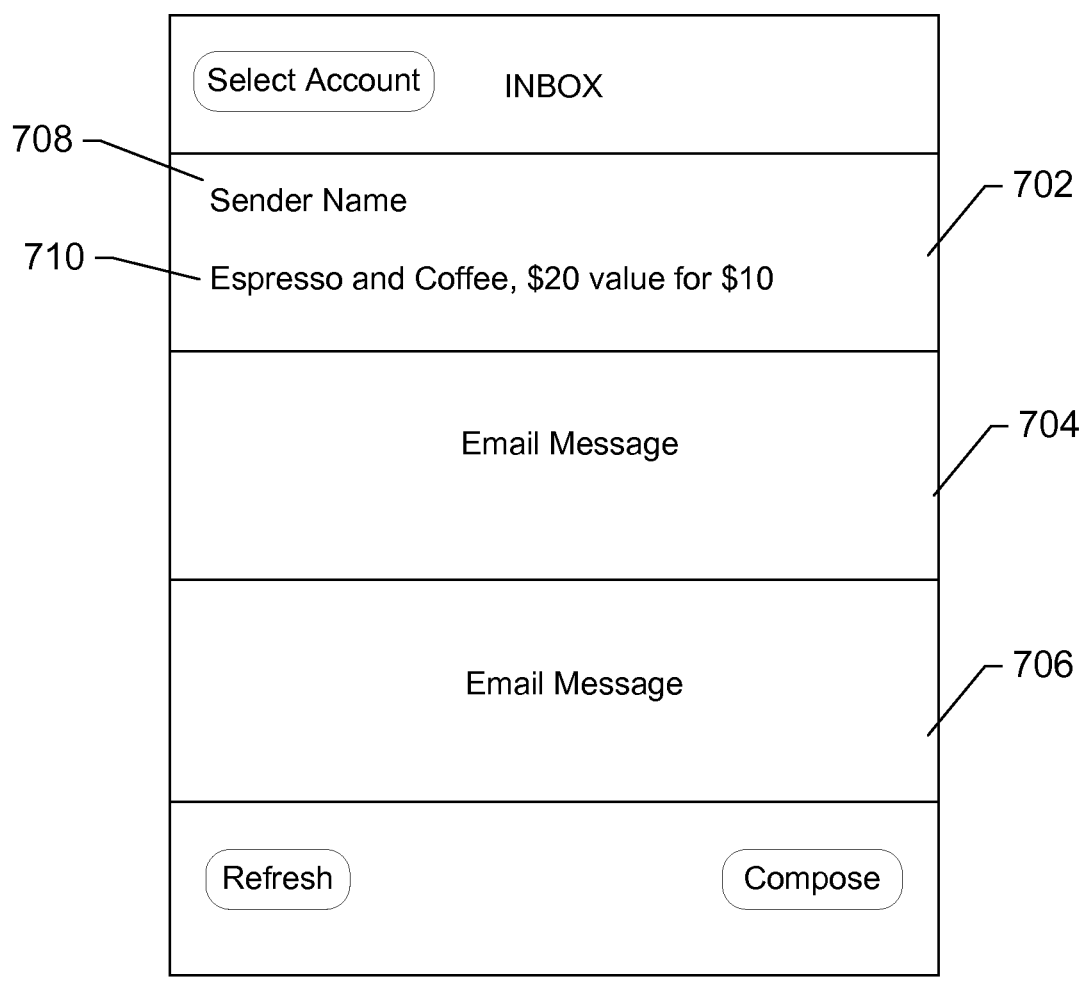
Figure 8:
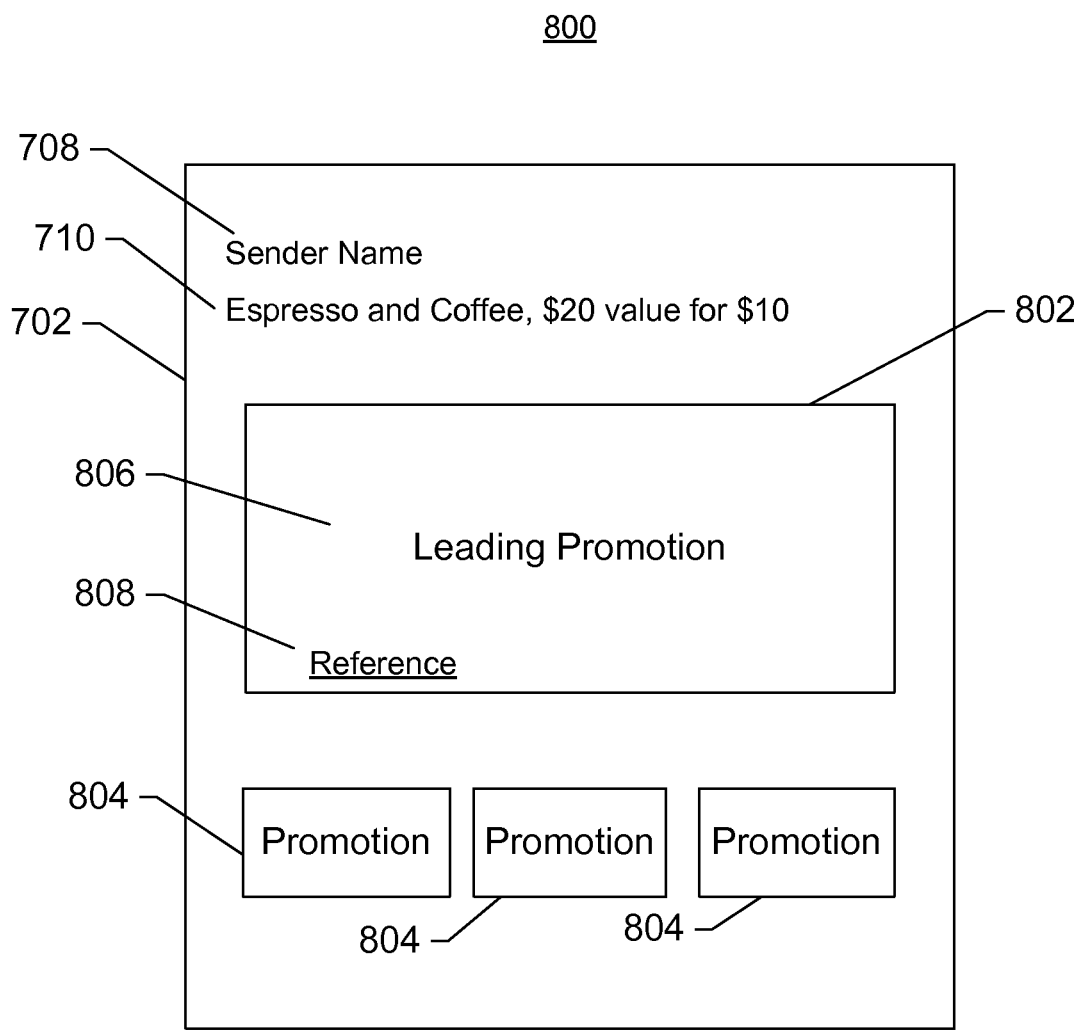

Having thus described some embodiments in general terms, reference will now be made to the accompanying drawings, which are not necessarily drawn to scale, and wherein:

FIG. 1 shows an example system, in accordance with some embodiments;

FIG. 2 shows example circuitry, in accordance with some embodiments;

FIG. 3 shows an example of a method flowchart for determining effectiveness of a leading message, in accordance with some embodiments;

FIG. 4 shows an example of a method flowchart for generating historical data, in accordance with some embodiments;

FIG. 5 shows an example of a method flowchart for determining an access rate score for a leading message term, in accordance with some embodiments;

FIG. 6 shows an example of a method flowchart for determining a predicted access rate for a leading message including multiple leading message terms, in accordance with some embodiments;

FIG. 7 shows an example consumer email inbox display, in accordance with some embodiments; and FIG. 8 shows an example trailing impression portion, in accordance with some embodiments.

DETAILED DESCRIPTION

Embodiments will be described more fully hereinafter with reference to the accompanying drawings, in which some, but not all embodiments contemplated herein are shown. Indeed, various embodiments may be implemented in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information" and similar terms may be used interchangeably to refer to data capable of being captured, transmitted, sent, received, displayed and/or stored in accordance with various example embodiments. Thus, use of any such terms should not be taken to limit the spirit and scope of the disclosure. Further, where a device is described herein to receive data from another device, it will be appreciated that the data may be received directly from the another device or may be received indirectly via one or more intermediary devices, such as, for example, one or more servers, relays, routers, network access points, base stations, and/or the like, sometimes referred to herein as a "network." Similarly, where a device is described herein to send data to another device, it will be appreciated that the data may be sent directly to the another device or may be sent indirectly via one or more intermediary devices, such as, for example, one or more servers, relays, routers, network access points, base stations, and/or the like.

As used herein, the term "method" refers to one or more steps that may be performed by a configured device, apparatus, system, circuitry, one or more processors, among other things. Where an example method is shown as including more than one step, it will be appreciated that the steps may be performed in different orders than as shown in the example and that not all steps are necessarily required. Furthermore, the methods are described herein as being performed by example structures for clarity and are not limited to those structures (e.g., a particular server, database, device, apparatus, etc.) in some embodiments.

Methods, systems, apparatus, and non-transitory computer program products described herein may be operable to provide impressions including leading messages to consumers. An "impression," as used herein, may include a communication, a display, or other perceived indication, such as a flyer, print media, email, text message, webpage, application alert, mobile applications, other type of electronic interface or distribution channel, and/or the like, of one or more promotions. In that sense, an impression may "indicate" one or more promotions. A "leading message," as used herein, may include a first message or communication of the impression that is presented to consumers. In a first example, where the impression is an e-mail message, the leading message may be the subject of the email. A consumer may read or otherwise consider the leading message in deciding whether to further explore the second portions of the impression, or the "trailing impression portion" of an impression.

For example, the consumer may read an email subject to decide whether to open and/or otherwise view (e.g., a preview mode) the email body. In another example, such as where the impression is provided via a text message to a mobile device, the leading message may include the message of the text with a reference (e.g., a hyperlink) to other portions of the impression (e.g., as may be accessed via a mobile application and/or webpage). In some embodiments, the leading message may include a textual description, summary, advertisement, etc. that may invoke a user to purchase, view, click, or otherwise access second content. For example, the techniques discussed herein for providing effective leading messages may be applied to descriptions of products, services, experiences, reference descriptions included in search results returned by search engines, descriptions of video and/or other digital content, among other things.

A "promotion," as used herein, may include, but is not limited to, any type of offered, presented or otherwise indicated reward, discount, coupon, credit, deal, incentive, discount, media, or the like that is indicative of a promotional value or the like that upon purchase or acceptance results in the issuance of an instrument (e.g., electronic or otherwise) that may be used toward at least a portion of the purchase of particular goods, services, and/or experiences defined by the promotion.

Some embodiments may include a system including circuitry configured to programmatically determine a predicted access rate for an impression that includes a leading message. For example, the leading message may be an email subject that may provoke a consumer to access the body portion of an email message. In that sense, the circuitry may be configured to track historical data indicating the access rates of leading messages and/or leading message terms, among other things. The circuitry may be further configured to leverage the historical data to determine predicted access rates for leading messages, such as based on algorithmic transformations of the historical data indicating historical access rates associated with one or more leading message terms of the leading message. In some embodiments, the circuitry may be further configured to provide recommendations for improved leading messages in response to receiving a leading message as an input.

Exemplary System Architecture

FIG. 1 shows an example system 100 in accordance with some embodiments. System 100 may include promotion and marketing system 102 (or "system 102"), network 104, consumer device 106, and merchant device 108. System 102 may be communicably connected with consumer device 106 and merchant device 108 via network 104. System 102 may include server 110 and database 112.

Server 110 may include circuitry, networked processors, or the like configured to perform some or all of the server-based processes described herein and may be any suitable network server and/or other type of processing device. In some embodiments, system 102 may function as a "cloud" with respect to the consumer device 106 and/or merchant device 108. In that sense, server 110 may include several servers performing interconnected and/or distributed functions. To avoid unnecessarily overcomplicating the disclosure, server 110 is shown and described herein as a single server.

Database 112 may be any suitable network storage device configured to store some or all of the information described herein. For example, database 112 may be configured to store promotion data indicating promotions and their parameters. In some embodiments, database 112 may be further configured to store consumer data (e.g., profile, preferences, purchase history, location, etc.) for targeting impressions and/or other messages to consumer device (e.g., based on individual relevance). Database 112 may be further configured to store consumer information including consumer account information, login information (e.g., identification and/or authentication data), consumer account history, etc. As such, database 112 may include, for example, one or more database systems, backend data servers, network databases, cloud storage devices, etc. To avoid unnecessarily overcomplicating the disclosure, database 112 is shown and described herein as a single database.

Network 104 may include one or more wired and/or wireless communication networks including, for example, a wired or wireless local area network (LAN), personal area network (PAN), metropolitan area network (MAN), wide area network (WAN), or the like, as well as any hardware, software and/or firmware for implementing the one or more networks (such as, e.g., network routers, switches, hubs, etc.). For example, network 104 may include a cellular telephone, mobile broadband, long term evolution (LTE), GSM/EDGE, UMTS/HSPA, IEEE 802.11, IEEE 802.16, IEEE 802.20, WiFi, dial-up, and/or WiMax network. Furthermore, network 104 may include a public network, such as the Internet, a private network, such as an intranet, or combinations thereof, and may utilize a variety of networking protocols now available or later developed including, but not limited to TCP/IP based networking protocols.

Consumer device 106 may be associated with a consumer and/or consumer account, such as a consumer with a consumer account provided by system 102. Although a single consumer device 106 is shown, system 100 may include any number of consumer devices 106 that may be associated with various other consumers and/or consumer accounts. Consumer device 106 may be a mobile device and/or a stationary device. For example, consumer device 106 may be a mobile device such as a cellular telephone (including smartphones and/or other types of mobile telephones), laptop, tablet, electronic reader, e-book device, media device, and/or the like. Additionally and/or alternatively, consumer device 106 may be a stationary device such as a desktop computer, work station, point-of-sale device, or the like.

Merchant device 108 may be associated with a merchant and/or provider of promotions. Although a single merchant device 108 is shown, system 100 may include any number of merchant devices that may be associated with various other merchants. In some embodiments, merchant device 108 may be configured to provide point-of-sale (POS) functionality for the merchant, such as at the merchant's shop. Furthermore, merchant device 108 may be a stationary and/or mobile device. In some embodiments, system 102 may be configured to receive promotion data indicating a promotion for goods and/or services and/or one or more parameters of the promotion (e.g., target audience, timing, purchase value, promotional value, residual value, etc.) from merchant devices 106. System 102 may then generate and/or provide one or more impressions indicating the promotion to consumer devices 106.

FIG. 2 shows a schematic block diagram of example circuitry 200, some or all of which may be included in system 102, server 110, database 112, user device 106, and/or merchant device 108. In accordance with some example embodiments, circuitry 200 may include various elements, such as one or more processors 202, memories 204, communications modules 206, and/or input/output modules 208.

In some embodiments, such as when circuitry 200 is included in system 102, messaging module 210 may also or instead be included with processor 202. As referred to herein, "module" includes hardware, software, and/or firmware configured to perform one or more particular functions. In this regard, the means of circuitry 200 as described herein may be embodied as, for example, circuitry, hardware elements (e.g., a suitably programmed processor, combinational logic circuit, integrated circuit, and/or the like), a computer program product comprising computer-readable program instructions stored on a non-transitory computer-readable medium (e.g., memory 204) that is executable by a suitably configured processing device (e.g., processor 202), or some combination thereof.

Processor 202 may, for example, be embodied as various means for processing including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments, processor 202 may comprise a plurality of means for processing. The plurality of means for processing may be embodied on a single computing device or may be distributed across a plurality of computing devices collectively configured to function as circuitry 200. The plurality of means for processing may be in operative communication with each other and may be collectively configured to perform one or more functionalities of circuitry 200 as described herein. In an example embodiment, processor 202 may be configured to execute instructions stored in memory 204 or otherwise accessible to processor 202. These instructions, when executed by processor 202, may cause circuitry 200 to perform one or more of the functions described herein.

Whether configured by hardware, firmware/software methods, or by a combination thereof, processor 202 may comprise an entity capable of performing operations according to embodiments of the present invention while configured accordingly. Thus, for example, when processor 202 is embodied as an ASIC, FPGA, or the like, processor 202 may comprise specifically configured hardware for conducting one or more operations described herein. As another example, when processor 202 may be embodied as an executor of instructions, such as may be stored in memory 204, the instructions may specifically configure processor 202 to perform one or more algorithms, methods, or operations described herein. For example, processor 202 may be configured to execute operating system applications, firmware applications, media playback applications, and/or media editing applications, among other things.

Memory 204 may comprise, for example, volatile memory, non-volatile memory, or some combination thereof. Although illustrated in FIG. 2 as a single memory, memory 204 may comprise a plurality of memory components. The plurality of memory components may be embodied on a single computing component or distributed across a plurality of computing components. In various embodiments, memory 204 may comprise, for example, a hard disk, random access memory, cache memory, flash memory, a compact disc read only memory (CD-ROM), solid state memory, digital versatile disc read only memory (DVD-ROM), an optical disc, circuitry configured to store information, integrated circuitry, chemical/biological memory, paper, or some combination thereof. Memory 204 may be configured to store information, data, applications, instructions, or the like for enabling circuitry 200 to carry out various functions in accordance with example embodiments discussed herein. For example, in at least some embodiments, memory 204 may be configured to buffer input data for processing by processor 202. Additionally or alternatively, in at least some embodiments, memory 204 may be configured to store program instructions for execution by processor 202 and/or data for processing by processor 202. Memory 204 may store information in the form of static and/or dynamic information. This stored information may be stored and/or used by circuitry 200 during the course of performing its functionalities.

Communications module 206 may be embodied as any component or means for communication embodied in circuitry, hardware, a computer program product comprising computer readable program instructions stored on a computer readable medium (e.g., memory 204) and executed by a processing device (e.g., processor 202), or a combination thereof that is configured to receive and/or transmit data from/to another device, such as, for example, a second circuitry 200 and/or the like. In some embodiments, communications module 206 (like other components discussed herein) can be at least partially embodied as or otherwise controlled by processor 202. In this regard, communications module 206 may be in communication with processor 202, such as via a bus. Communications module 206 may include, for example, an antenna, a transmitter, a receiver, a transceiver, network interface card and/or supporting hardware, and/or firmware/software for enabling communications. Communications module 206 may be configured to receive and/or transmit any data that may be stored by memory 204 using any protocol that may be used for communications. Communications module 206 may additionally and/or alternatively be in communication with the memory 204, input/output module 208, and/or any other component of circuitry 200, such as via a bus. Communications module 206 may be configured to use one or more communications protocols such as, for example, short messaging service (SMS), Wi-Fi (e.g., a 802.11 protocol, Bluetooth, etc.), radio frequency systems (e.g., 900 MHz, 1.4 GHz, and 5.6 GHz communication systems), infrared, GSM, GSM plus EDGE, CDMA, quadband, and other cellular protocols, VOIP, or any other suitable protocol Input/output module 208 may be in communication with processor 202 to receive an indication of an input and/or to provide an audible, visual, mechanical, or other output. In that sense, input/output module 208 may include means for implementing analog-to-digital and/or digital-to-analog data conversions. Input/output module 208 may include support, for example, for a display, touch screen, keyboard, button, click wheel, mouse, joystick, an image capturing device, microphone, speaker, biometric scanner, and/or other input/output mechanisms. In embodiments where circuitry 200 may be implemented as a server or database, aspects of input/output module 208 may be reduced as compared to embodiments where circuitry 200 may be implemented as an end-user machine or other type of device designed for complex user interactions. In some embodiments (like other components discussed herein), input/output module 208 may even be eliminated from circuitry 200. Alternatively, such as in embodiments wherein circuitry 200 is embodied as a server or database, at least some aspects of input/output module 208 may be embodied on an apparatus used by a user that is in communication with circuitry 200. Input/output module 208 may be in communication with memory 204, communications module 206, and/or any other component(s), such as via a bus. Although more than one input/output module and/or other component can be included in circuitry 200, only one is shown in FIG. 2 to avoid overcomplicating the disclosure (e.g., like the other components discussed herein).

In some embodiments, messaging module 210 may also or instead be included and configured to perform the functionality discussed herein related to providing impressions (e.g., impressions including leading messages) to consumers and/or optimizing the leading messages for higher consumer access rates. In some embodiments, some or all of the functionality of messaging module 210 may be performed by processor 202. In this regard, the example processes discussed herein can be performed by at least one processor 202 and/or messaging module 210. For example, non-transitory computer readable storage media can be configured to store firmware, one or more application programs, and/or other software, which include instructions and other computer-readable program code portions that can be executed to control processors of the components of system 200 to implement various operations, including the examples shown herein. As such, a series of computer-readable program code portions may be embodied in one or more computer program products and can be used, with a device, server, database, and/or other programmable apparatus, to produce the machine-implemented processes discussed herein.

Any such computer program instructions and/or other type of code may be loaded onto a computer, processor, and/or other programmable apparatus's circuitry to produce a machine, such that the computer, processor, or other programmable circuitry that executes the code may be the means for implementing various functions, including those described herein. In some embodiments, one or more external systems (such as a remote cloud computing and/or data storage system) may also be leveraged to provide at least some of the functionality discussed herein.

As described above and as will be appreciated based on this disclosure, various embodiments may be implemented as methods, mediums, devices, servers, databases, systems, and the like. Accordingly, embodiments may comprise various forms, including entirely of hardware or any combination of software and hardware. Furthermore, embodiments may take the form of a computer program product on at least one non-transitory computer readable storage medium having computer readable program instructions (e.g., computer software) embodied in the storage medium. Any suitable computer-readable storage medium may be utilized including non-transitory hard disks, CD/DVD-ROMs, flash memory, optical storage devices, quantum storage devices, chemical storage devices, biological storage devices, magnetic storage devices, etc.

Embodiments have been described above with reference to block diagrams of components, such as functional modules, system components, and circuitry. Below is a discussion of an example process flowcharts describing functionality that may be implemented by one or more components and/or means discussed above and/or other suitably configured circuitry. Each block of the block diagrams and process flowcharts, and combinations of blocks diagrams and process flowcharts, respectively, can be implemented by various means including computer program instructions. These computer program instructions may be loaded onto a general purpose computer, special purpose computer, or other programmable data processing apparatus, such as processor 202, to produce a machine, such that the computer program product includes the instructions which execute on the computer or other programmable data processing apparatus to create a means for implementing the functions specified in the flowchart block or block diagrams.

These computer program instructions may also be stored in a computer-readable storage device (e.g., memory 204) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for implementing the specified functions, combinations of steps for performing the specified functions and program instruction means for implementing the specified functions. It will also be understood that each block of the block diagrams and process flowcharts, and combinations of blocks in the block diagrams and process flowcharts, can be implemented by special purpose hardware-based computer systems that perform the specified functions or steps, or combinations of special purpose hardware and computer instructions.

Providing Optimized Leading Messages

FIG. 3 shows an example of a method 300 for determining the effectiveness of a leading message, in accordance with some embodiments. In particular, method 300 may be performed to provide a prediction of how a leading message received as input may be expected to perform, such as by determining a predicted access rate for the leading message. As discussed above, an impression may include a leading message that may be a first portion of a communication of the impression which the consumer may read to determine whether to further explore and/or otherwise access additional portions of the impression. A leading message may be deemed effective when consumers are motivated by the contents of the leading message to access additional information, create a consumer account, browse other promotions, purchase the promotion, and/or among other things.

Accordingly, in some embodiments, the effectiveness of the leading message may be defined as a function of the "access rate" of the leading message and/or the access rates of components (e.g., "leading message terms," as used herein) of the leading message. Method 300 is described as being performed by system 102 (e.g., server 110), however, other suitably configured structures (e.g., one or more servers, a networked device, hardware, software, firmware, circuitry, etc.) may also be used in various embodiments.

Method 300 may begin at 302 and proceed to 304, where server 110 may be configured to receive a leading message including leading message terms, such as one leading message term, one or more leading message terms, two or more leading message terms, or a plurality of leading message terms. For example, in some embodiments, the leading message may be an email subject including leading message terms that are each a word and/or phrase. In some embodiments, the leading message may be received by circuitry from a non-transitory computer readable medium, such a memory and/or database. In another example, the leading message may be received from a user input device (e.g., a keyboard, touchscreen, mouse, etc. of an operator of system 102) that is in communication with processing circuitry configured to perform method 300. For example, an operator or other user may be allowed to provide leading messages and/or leading message terms for analysis and/or impression creation.

In various embodiments, the leading message may be associated with a particular type of impression and/or communication channel by which the impression is sent to consumers. For example, the email subject of an impression provided by email may be the leading message of the impression. In another example, the leading message may be the contents of a short messaging service (SMS) text to a consumer device, such as a mobile device (e.g., a smartphone). In a text message, the leading message may provide a reference to a webpage and/or application that is accessible by the mobile device. In another example, the leading message may include the contents of an application alert, such as a short description regarding the contents of the application alert. In that sense, a leading message may include a first message or communication of an impression that is presented to consumers in connection with an option for the consumer to take additional steps for accessing the other portions of the impression.

In some embodiments, a leading message may include one or more leading message terms. For example, the number of terms in the leading message (e.g., leading message term length) may be selected to optimize marketability, readability, and/or descriptiveness, among other things. For example, a leading message term length of five leading message terms (e.g., words and/or phrases) may be used for email subjects because longer messages, while generally more descriptive, may be truncated in a consumer's email inbox window and/or require too much careful consumer inspection to understand, among other things.

At 306, server 110 may be configured to determine an access rate score for a leading message term of the leading message. For example, server 110 may be configured to determine the access rate score for the leading message term based on historical data indicating frequencies at which consumers accessed impressions including at least the leading message term. The historical data, for example, may be stored in database 112 and accessed by server 110 to determine access rate scores. In some embodiments, server 110 may be configured to generate the historical data in connection with commercial interactions with consumer devices (e.g., providing, selling, etc. of promotions to consumers).

In some embodiments, server 110 may be configured to determine the access rate score for one or more leading message terms, two or more leading message terms, a plurality of leading message terms, or each leading message term of the leading message. The access rate score for a leading message term may be configured to provide an indication of the effectiveness (e.g., based on various metrics and/or combinations thereof) of the leading message term when used within a leading message. For example, the access rate score may include an algorithmic transformation of a measured access rate (e.g., the frequency at which consumers accessed impressions including the leading message term). In general, leading messages provided to consumers may include one leading message term, one or more leading message terms, two or more leading message terms, or a plurality of leading message terms. Often, a plurality (e.g., 3, 4, 5, 6, etc.) of leading message terms may be included in a leading message, rather than a single leading message term or only two leading message terms. Historical data indicating an access rate of a leading message term may be skewed by the effect of other leading message terms provided in common leading messages, or "connected leading message terms."

Some embodiments may provide techniques for determining access rate scores (e.g., an attribution score) that are independent of noise in raw historical data caused by the contributory effectiveness of connected leading message terms that were provided in the same leading message (e.g., within a leading message of an impression). The access rate score may be configured to provide an accurate indication of capability and/or tendency of the leading message term to induce consumers to access impressions (and/or secondary portions thereof) that include the leading message term.

In some embodiments, similar techniques as discussed herein for access rate may be leveraged to optimize the ability of a leading message to induce other actions. Some example actions may include consumer registration (e.g., create new consumer account for new person), promotion purchase, and/or among other things. For example, server 110 may configured to determine a promotion purchase score for the leading message term based on frequencies at which consumers purchased promotions via impressions including the leading message term (e.g., as may be indicated by the historical data). In another example, server 110 may configured to determine a new registration score for the leading message term based on frequencies at which unregistered users created consumer accounts after receiving impressions including the leading message term, even where the leading message term has only been provided to consumers in combination with other leading message terms.

At 308, server 110 may be configured to determine a predicted access rate for the leading message based at least in part on the access rate score of the leading message term. For example, in embodiments where the leading message is an email subject, the predicted access rate for the leading message may indicate a rate at which consumers are predicted to open an email including the leading message as the email subject. In some embodiments, server 110 may be configured to determine the predicted access rate for the leading message based on the access rate score for the leading message term and one or more other access rate scores for one or more other leading message terms of the leading message. For example, the predicated access rate may be determined based on access rate scores for each of the leading message terms of the leading message, such as by taking the sum of the access rate scores and/or an average of the access rate scores. Method 300 may then proceed to 310 and end.

FIG. 4 shows an example of a method 400 for generating historical data, in accordance with some embodiments. The historical data, as discussed above, may include associations between leading message terms and the rate at which consumers opened an impression including the leading message term in the leading message (e.g., the access rate). Method 400 is described as being performed by system 102 (e.g., server 110), however, other suitably configured structures (e.g., one or more servers, a networked device, hardware, software, firmware, circuitry, etc.) may also be used in various embodiments. For example, a backend machine of system 102 may be configured to perform tasks associated with processing the historical data while server 110 may be configured to provide impressions and/or generate the historical data by tracking consumer activity. In various embodiments, method 400 may be performed before, after, and/or concurrently with method 300. For example, the historical data generated by method 400 may be used at 306 of method 300 to determine the access rate score for each leading message term. In another example, an impression including a leading message term selected based on the historical data may be provided to consumer devices with access tracking features to generate additional historical data and/or otherwise update the historical data.

Method 400 may begin at 402 and proceed to 404, where server 110 may be configured to provide an impression including a leading message. The impression may include an indication of one or more promotions being offered to consumers. The leading message may include one or more leading message terms intended to convey the features of at least one promotion and/or otherwise pique the interest of the consumer. In some embodiments, the promotions may be indicated by promotion data that is stored in database 112. Server 110 may be further configured to access the promotion data (e.g., from a non-transitory computer readable medium) and/or otherwise determine (e.g., generate) the promotion data. For example, in some embodiments, server 110 may be configured to access the promotion data by communicating with database 112, where the promotion data may be stored.

In some embodiments, server 110 may be configured to generate the impression including the plurality of promotions and/or the leading message based on the promotion data. As discussed above, the impression may be a communication, a display, or other perceived indication, such as a flyer, print media, webpage, e-mail, text message, application alert, mobile applications, other type of electronic interface or distribution channel and/or the like, of the plurality of promotions.

In some embodiments, the impression may be an email including the email subject as the leading message. FIG. 7 shows an example consumer email inbox display 700, in accordance with some embodiments. Consumer email inbox display 700 may include a display of email messages received by the consumer such as messages 702, 704, and 706. Message 702 may be an example of an impression that server 110 may be configured to provide to consumer device 106. Message 702 may include leading message 710 and sender indicator 708. One example of a leading message, as illustrated, may be "Espresso and Coffee, $20 value for $10," as shown for leading message 710.

At 406, server 110 may be configured to receive access data from the consumer device indicating that the impression has been accessed. For example, server 110 may receive the access data from consumer device 106 in response to the consumer selecting message 702 via email inbox display 700, the consumer may be presented with a second portion of the impression (or "trailing impression portion"). In the email channel shown, the trailing message may include the body of email message 702. In that sense, server 110 may be configured to provide a trailing impression portion in response to receiving data from the consumer device 106 indicating that the impression has been accessed.

FIG. 8 shows an example trailing impression portion 800, in accordance with some embodiments. Trailing impression portion 800 may include an indication of one or more promotions, such as leading promotion 802 and/or promotions 804. Leading promotion 802, when used, may be related to the subject matter of message 702 and leading message 710 and/or may be featured more prominently within trailing impression portion 800. Leading promotion 802 may include leading promotion display 806 configured to provide additional information about leading promotion 802, such as via text, video, interactive, and/or graphical displays. For example, leading promotion display 806 may include one or more references (e.g., reference 808) that are selectable by the consumer and configured to facilitate the purchase of leading promotion 802 and/or among other things (e.g., consumer registration, consumer activity with system 102, consumer historical data tracking, etc.). In some embodiments, such as when access rates are used, the consumer may be determined to have accessed the promotion upon the consumer selecting the leading message (such as email message 702 in consumer email inbox display 700), upon the consumer otherwise receiving the trailing impression portion 800, and/or upon the consumer selecting an associated reference 808 of a leading promotion 802.

At 408, server 110 may be configured to generate historical data indicating frequencies at which consumers accessed impressions including the leading message terms based on the received access data. For example, the historical data may indicate the number of impressions sent to consumer devices including the leading message terms and the number of secondary impressions that are accessed by the consumer devices (e.g., after being provided with the leading message). Server 110 may be further configured to determine an access rate of the leading message terms, such as may be determined based on a ratio of the number of secondary impressions that are accessed by the consumers (e.g., as may be indicated by access data received at 406 from consumer devices) against the number of impressions sent to consumer devices including the leading message terms (e.g., as may be determined based on the number of impressions sent at 404 to consumer devices).

In some embodiments, the historical data may further include leading message metadata (e.g., including leading message term metadata). For example, server 110 may be configured to determine and/or otherwise track, for impressions including the leading message term sent to consumer devices, the leading message (e.g., the entire message including each leading message term and their positions), the position of the leading message term within the leading message (e.g., first word, second word, etc.), the leading message term length, the syntactical position of leading message term in relation to the leading message, the format of the leading message term (e.g., all capital letters, starting capital letter, bold, italics, etc.), nearby punctuations (e.g., immediately prior to and/or following the leading message term), nearby preposition phrases (e.g., "of," to," for," etc.), and/or nearby special characters (e.g., digits, numbers, symbols, graphics, videos), among other things. As discussed in greater detail below with respect to method 600 and FIG. 6, the leading message metadata may be used to weigh various factors that may be programmatically applied to determine a "predicted access rate" for the leading message (e.g., based on the historical data).

In some embodiments, server 110 may be configured to store the historical data to computer readable medium, including non-transitory computer readable mediums such as a memory and/or database (e.g., database 112) for further processing and/or future access. Method 400 may then proceed to 410 and end.

FIG. 5 shows an example of a method 500 for determining an access rate score for a leading message term, in accordance with some embodiments. The access rate score (e.g., as also discussed at 306 of method 300) may provide an accurate indication of the ability and/or tendency of the leading message term to induce consumers to access impressions (and/or secondary portions thereof) that include the leading message term. In some embodiments, method 500 may be performed at 306 of method 300, such as after receiving a leading message including a plurality of leading message terms at 306.

Method 500 may begin at 502 and proceed to 504, where server 110 may be configured to access historical data indicating frequencies at which consumers accessed impressions including the leading message term or terms. For example, the historical data may include the historical data generated using method 400. The historical data may be stored by system 102, such as in database 112, and accessed by server 110 based on receiving the leading message term (e.g., as part of the leading message at 304 of method 300).

At 506, server 110 may be configured to determine whether a leading message term of the leading message is found in the historical data. For example, server 110 may be configured to query database 112 using the leading message term. A new leading message term that does not have a corresponding match in the historical data may be determined to have failed to be found in the historical data. Conversely, server 110 may determine that the leading message term is found in the historical data if a match is found, such as may be returned from database 112.

In response to determining that the leading message term was found in the historical data, method 500 may proceed to 508, where server 110 may be configured to determine the access rate score for the leading message term based on the historical data.

In some embodiments, the access rate score for the leading message term may include an attribution score. As discussed above, the historical data may for a leading message term may be skewed by the connected access rates of one or more other leading message terms that were provided in the same leading message. For example, where a leading message that includes leading message terms "espresso" and "coffee" (e.g., as shown at leading message 710 of FIG. 7) receives a high access rate, it may not be clear which of the two leading message terms are more responsible for the high access rate, "espresso" or "coffee", and/or their relative levels of contribution. In some embodiments, server 110 may be configured to determine the access rate score (e.g., as and/or including an attribution score) which may be configured to account for such examples by determining (e.g., based on other historical data), the attribution scores of leading messages including "espresso" and "coffee," apart from each other. In other words, if other impressions with "espresso" do not have high access rates while other impressions with "coffee" have higher access rates, the attribution score for espresso may be increased by an amount or factor while the attribution score for coffee may be decreased by an amount or factor (e.g., despite leading message 710 including both leading message terms). In some embodiments, the process may be repeated iteratively for each leading message term until the attribution score converges upon a "true" access rate for each leading message term individually.

In some embodiments, server 110 may be configured to determine the attribution scores for leading message terms based on the historical data by generating a leading message matrix. For example, the leading message matrix may be defined by example leading message matrix $LM_0$:

$$LM_0 = \begin{bmatrix} \text{Access Rate} & \cdots & \text{Access Rate} \\ \text{(Leading Message 1, term 1)} & & \text{(Leading Message 1, term } M) \\ \text{Access Rate} & \cdots & \text{Access Rate} \\ \text{(Leading Message 2, term 1)} & & \text{(Leading Message 2, term } M) \\ \vdots & \cdots & \vdots \\ \vdots & \cdots & \vdots \\ \text{Access Rate} & \cdots & \text{Access Rate} \\ \text{(Leading Message } N, \text{ term 1)} & & \text{(Leading Message } N, \text{ term } M) \end{bmatrix}$$

where M is an index that represents the total number of distinct leading message terms, and where N is an index that represents the total number of distinct leading messages that have been provided to consumers. In some embodiments, for entries within matrix $LM_0$ corresponding with a leading message that did not include a corresponding leading message term (e.g., no leading messages including the leading message terms found), the access rate may be set to an average access rate for (e.g., all) leading messages terms. Conversely, the access rate may be set to actual access rates for the entries within matrix $LM_0$ corresponding with leading messages that included the corresponding leading message term.

In some embodiments, server 110 may be further configured to define a selection matrix for a leading message term, as may be defined as shown by matrix $S_0$:

$S_0 = [1 \text{ (Leading Message 1) } 1 \text{(Leading message 2) } \ldots 1 \text{(Leading Message N)}]$, where N is an index that represents the total number of distinct leading messages that have been provided to consumers. Matrix $S_0$ may include a row of N entries that are each initialized at 1 or another constant number.

Server 110 may be further configured to generate a selection matrix $S_1$ for the leading message term, as may be defined as shown by Equation 1:

$S_1 = k \times LM_0 \times S_0$ where k is a constant.

Based on selection matrix $S_1$, server 110 may be further configured to determine an iterative leading message matrix $LM_1$, by changing each row $LM_1[j,*]$ of $LM_1$ to multiple of R and $S_1$ as defined in Equation 3:

$LM_1[j,*]$ Transpose(Transpose($LM_0[j,*]$))×(Transpose($S_1$)), where Transpose stands for standard matrix transpose, or as more generally defined by Equation 4:

$LM_{i+1}[j,*] = k \times \text{Transpose}(\text{Transpose}(LM_i[j,*])) \times (\text{Transpose}(S_{i+1}))$, where i is an index indicating an iteration number. Similar iterations may be performed, and with sufficient iterations, the attribution scores represented by iterative leading message matrix LM may converge upon a value that corresponds with measured access rates of the leading message terms, but having the influence of connected leading message terms programmatically removed and/or reduced. In that sense, server 110 may be configured to determine an attribution score of a leading message term by accessing historical data embodied as entries within an iterative leading message matrix.

In some embodiments, server 110 may be further configured to determine the attribution score of the leading message terms based on adjusting for statistical fluctuations of measure access rates (e.g., as may be more noticeable for smaller volumes of relevant historical data). Smaller samplings of historical data used to determine the attribution score and/or the access rate score may be weighted less than larger samplings of historical data. For example, server 110 may be configured to determine a smoothed attribution score for a leading message term as defined by Equation 5:

$$\text{Smoothed attribution score} = \frac{ARaverage + \sum_{i=1}^{N} \text{Attribution rate}(i)}{N+1},$$

where ARaverage is an average attribution score and N is the total number of impressions that have been provided to consumer devices including leading messages having the leading message term. Attribution scores may be kept closer to the average attribution score for smaller samplings of attribution rates as indicated by N. In some embodiments, the access rate entries within a leading message matrix and/or iterative leading message matrix may be processed to determine smoothed attribution scores, which may be used in addition or alternative to unsmoothed attribution scores.

In some embodiments, server 110 may be configured to additionally and/or alternatively determine the access rate score for a leading message term based on determining an occurrence count for the leading message term. For example, the occurrence count for a leading message term may indicate a difference between the number of occurrences of the leading message term in impressions with access rates below and above a median access rate (e.g., of the leading message term and/or of a collection of leading message terms). For example, server 110 may be configured to determine (e.g., based on the historical data) an average access rate for the leading message term, a first number of impressions including the leading message term that resulted in an access rate greater than the average access rate and a second number of impressions including the leading message term that resulted in an access rate less than the average access rate. Next, server 110 may be configured to determine the occurrence count for the leading message term based on a difference between the first number of impressions and the second number of impressions.

In various embodiments, one or more of the techniques discussed herein associated with determining the access rate score for the leading message term may be used. For example, the access rate score may comprise a sum (e.g., a weighted sum) of the attribution score, occurrence rank, smoothed access rate score, and/or unsmoothed access rate score, among other things. Method 500 may then proceed to 510 and end.

Returning to 506, in response to determining that the leading message term failed to found in the historical data, method 500 may proceed to 512, where server 110 may be configured to determine one or more leading message terms (or "related leading message terms," as used herein) that are related to the leading message term. For example, server 110 may be configured to determine syntactical similarity between different leading message terms based on a programmatically determined similarity score. In some embodiments, the similarity score may be determined based on computing an edit distance between the leading message term and one or more of the other leading message terms of the historical data. Server 110 may be further configured to determine the one or more related leading message terms based the edit distances, such as by selecting one or more of the closely matching leading message terms as the related leading message terms.

At 514, server 110 may be configured to determine an access rate score for each of the one or more related leading message terms. The discussion at 508 for determining the access rate score of a leading message term may be applicable at 514 for each of the one or more related message terms.

At 516, server 110 may be configured to determine an estimated access rate score for the leading message term based on the access rate score for each of the one or more related leading message terms. For example, the estimated access rate score may be determined based on the average (e.g., weighted or otherwise) of the access rate scores for each of the one or more leading message terms. For example, in some embodiments, a related leading message term having a higher syntactical relationship (e.g., similarity score) with the leading message term may be given a higher weighting factor than another related leading message term having a lower syntactical relationship. Method 500 may then proceed to 510 and end.

FIG. 6 shows an example of a method 600 for determining a predicted access rate for a leading message, in accordance with some embodiments. The predicted access rate for the leading message (e.g., as also discussed at 308 of method 300) may indicate a rate at which consumers may be predicted to access a second portion of an impression (e.g., email body) when provided with the leading message (e.g., email subject). In some embodiments, method 600 may be performed at 306 of method 300, such as after receiving a leading message for programmatic evaluation.

Method 600 may be begin at 602 and proceed to 604, where server 110 may be configured to determine access rate scores one or more of the leading message terms of the leading message. For example, method 500 may be used to determine access rate scores for each of the leading message terms.

At 606, server 110 may be configured to determine the predicted access rate for the leading message based on the access rate scores for the leading message terms of the leading message. For example, the predicted access rate may be determined based on a sum of the access rate scores (e.g., weighted or otherwise) and/or an average of the access rate scores (e.g., weighted or otherwise).

In some embodiments, server 110 may be configured to additionally and/or alternatively determine the predicted access rate for the leading message based on (e.g., historical) leading message metadata (e.g., as discussed at 408 of method 400) and the syntactical structure of the leading message. The predicted access rate may be determined based on applying weights to the access rate scores, where the weighting values may be determined based on the leading message metadata associated and/or relevant with the leading message under analysis. For example, a leading message term at and/or near the beginning of a leading message may have a larger impact upon the access rate of an impression than the same leading message term when located at and/or near the back of the leading message. Accordingly, a larger weighting value may be applied to the access rate score of a leading message term when the leading message term is at and/or near the front of the leading message under analysis and/or a smaller weighting value may be applied to the access rate score of a leading message term when the leading message term is at and/or near the back of the leading message.

In another example, a leading message term preceding (e.g., immediately preceding and/or within a proximity to) a special character (e.g., an exclamation point, which may also be an example leading message term) may have a larger impact upon the access rate of an impression than the same leading message term when not preceding a special character. Accordingly, a larger weighting value may be applied to the access rate score of a leading message term when the leading message term precedes a special character in the leading message under analysis and/or a smaller weighting value may be applied to the access rate score of a leading message term when the leading message term precedes a special character. In some embodiments, different special characters (e.g., punctuation marks, symbols, digits, numbers, non-standard characters, graphics, videos, etc.) may contribute to different weighting values for the access rate.

In some embodiments, a special character contained within, preceding, and/or succeeding a message may have an impact on the predicted access rate of the leading message. Accordingly, a larger or smaller predicted access rates may be assigned to leading messages containing the special characters.

In some embodiments, leading messages that contain stop words with high frequency such as "of," "to," or "for" may be also given appropriate weighting values. In addition to the keywords, these stop words (e.g., depending on the word and/or its location within the leading message) may increase or decrease the predicted access rate of the leading message.

In some embodiments, server 110 may be further configured to provide the predicted access rate for the leading message subsequent to determining the predicted access rate. For example, the predicted access rate may be provided to a display device, such as a monitor or touchscreen. In another example, the predicted access rate may be stored, such as in database 112 and/or other memory, for future use and/or further processing. In some embodiments, server 110 may be configured to allow an operator to provide a second leading message (e.g., as discussed at 304 of method 300) for analysis.

At 608, server 110 may be configured to determine a predicted access rate threshold value. The predicted access rate threshold value may be configured to act as a bar for determining whether the predicted access rate is sufficiently high for the leading message to be sent to consumers. For example, the predicted access rate threshold value may be set at 25% such that predicted access rates greater than 25% exceed the predicted access rate threshold value.

At 610, server 110 may be configured to determine whether the predicted access rate exceeds the predicted access rate threshold value. Returning to the example above, a predicted access rate above the predicted access rate threshold value of 25% may be determined to exceed the predicted access rate threshold value and may be sent to consumers.

In response to determining that the predicted access rate fails to exceed the predicted access rate threshold value, method 600 may proceed to 608, where server 110 may be configured to provide a recommended leading message term as a substitute for a leading message term of the leading message. Server 110 may be further configured to determine and/or provide a recommended leading message that includes the replacement leading message term, such as in place of a less effective (e.g., as determined at least in part by the access rate score) leading message term. As such, a recommended predicted access rate for the recommended leading message may be higher than the predicated access rate for the leading message.

With reference to leading message 708 in FIG. 7, for example, server 110 may be configured to provide the leading message term "Latte" as a replacement for the leading message term "Espresso." "Espresso and Coffee, $20 value for $10," as shown for leading message 708, may be updated to "Latte and Coffee, $20 value for $10," based on server 110 programmatically determining the replacement leading message as having a higher predicted access rate than leading message 708 and/or a predicted access rate exceeding the predicted access rate threshold value. Similarly, server 110 may be configured to provide a recommended revised presentation of the leading message terms in the leading message. For example, "Espresso and Coffee, $20 value for $10," as shown for leading message 708, may be updated to "Coffee and Espresso, $20 value for $10," based on server 110 programmatically determining the replacement revised presentation of the leading message as having a higher predicted access rate than leading message 708 and/or a predicted access rate exceeding the predicted access rate threshold value. In some embodiments, server 110 may be configured to determine and/or otherwise access leading message metadata that includes associations of related, synonymous, and/or otherwise relevant leading message terms that could be suitably used as replacements for each other within leading messages. The leading message metadata may be leveraged to determine, for example, the list of potential replacement leading message term candidates for one or more of the leading message terms of the leading message. Server 110 may be further configured to select the replacement leading message term from the candidates, such as based on access rate scores and/or differences in predicted access rates of the leading message using different candidate leading message terms.

In some embodiments, server 110 may be configured to provide the replacement leading message term and/or replacement to the display device, such as for consideration by the operator. Server 110 may be further configured to provide impressions including the replacement leading message term, such as upon receiving approval data from a user input device. Method 600 may then proceed to 612 and end. Returning to 608, in response to determining that the predicted access rate exceeds the predicted access rate threshold value, method 600 may proceed to 612 and end.

CONCLUSION

Many modifications and other embodiments will come to mind to one skilled in the art to which these embodiments pertain having the benefit of the teachings presented in the foregoing descriptions and the associated drawings. For example, the techniques discussed herein involving impression for promotions can be easily be extended to other contexts where impressions of goods, services, and/or experiences may be offered to consumers. In another example, the embodiments discussed herein with respect to the email communication channel may also be extended to other communication channels, such as mobile alerts, application alerts, text messages, social networking system alerts and/or messages webpages, and other suitable communication channels where consumers receive advertisements with leading messages. In yet another example, the techniques discussed herein for providing effective leading messages may also be applied to other areas where consumer behavior can be affected by the content of a promotional message, such as titles, names, and/or descriptions of items (e.g., videos, photos or micro-blogs) that may cause a consumer to access, buy, and/or view the items. Therefore, it is to be understood that embodiments and implementations are not to be limited to the specific example embodiments disclosed and that modifications and other embodiments are intended to be included within the scope of the appended claims. Although specific terms are employed herein, they are used in a generic and descriptive sense only and not for purposes of limitation.

That which is claimed:

1. A system for programmatically generating an electronic communication, comprising:
   an apparatus including processing circuitry configured to:
      receive, from a user input device in communication with the processing circuitry, a leading message including a plurality of leading message terms, wherein the leading message is an email subject;
      determine an access rate score for a first leading message term of the plurality of leading message terms based on historical data indicating frequencies at which consumers accessed electronic communications including leading message terms and frequencies at which consumers accessed a trailing impression portion included within the accessed electronic communications, wherein the accessed electronic communications include emails each indicating one or more promotions, and wherein the trailing impression portion is a body of the email;
      determine a predicted access rate for the leading message based at least in part on the access rate score for the first leading message term, wherein the predicted access rate for the leading message indicates a rate at which consumers are predicted to open an email including the leading message as the email subject;
      access a previously generated predicted access rate threshold;
      determine whether the predicted access rate satisfies the predicted access rate threshold; and
      in response to determining that the predicated access rate fails to satisfy the predicted access rate threshold:
         generate updated leading messages as possible substitutes for the leading message, each updated leading message comprising a plurality of terms;
         determine predicted access rates for each of the updated leading messages based on a plurality of predicted access rate scores, each of the plurality of predicted access rate scores corresponding to a respective term of the plurality of terms of each of the updated leading messages, by:
            deriving the plurality of predicted access rate scores corresponding respectively to each term of the plurality of terms of the corresponding updated leading message by:
               generating a leading message matrix,
               generating a selection matrix based on the leading message matrix,
               generating an iterative leading message matrix based on leading message matrix and the selection matrix, and
               calculating an attribution score for each term of the plurality of terms in each of the updated leading messages by iterating through the iterative leading message matrix, wherein each attribution scores represented by the iterative leading message matrix converges upon a value that corresponds with measured access rates of the terms of the updated leading messages, but having an influence of connected leading message terms programmatically removed or reduced,
wherein each of the plurality of predicted access rate scores corresponding, respectively, to each of the plurality of terms is based at least in part on the respective attribution score for the corresponding term of the plurality of terms;
determine a selected updated leading message having the highest determined predicted access rate of the updated leading messages, wherein the selected updated leading message is an updated email subject;
generate the electronic communication including the selected updated leading message; and
transmit the electronic communication to the user input device.

2. The system of claim 1, wherein the processing circuitry is configured to determine the access rate score for the first leading message term based on the historical data by being configured to determine a frequency at which consumers accessed electronic communications including the first leading message term.

3. The system of claim 1, wherein the processing circuitry is configured to determine the access rate score for the first leading message term based on the historical data by being configured to:
determine one or more related leading message terms related to the first leading message term;
determine, based on the historical data, an access rate score for each of the one or more related leading message terms; and
determine an estimated access rate score for the first leading message term as the access rate score for the first leading message term based on the access rate score for each of the one or more related leading message terms.

4. The system of claim 3, wherein the processing circuitry is configured to determine the one or more related leading message terms related to the first leading message term by being configured to:
determine that the first leading message term is different from the leading message terms indicated by the historical data;
determine a similarity score between the first leading message term and the leading message terms of the historical data; and
determine the one or more related leading message terms based on the similarity score between the first leading message term and the leading message terms indicated by the historical data.

5. The system of claim 1, wherein the processing circuitry is configured to determine the predicted access rate for the leading message by being configured to:
determine an access rate score for a second leading message term based on historical data indicating frequencies at which consumers accessed electronic communications including at least the second leading message term; and
determine the predicted access rate for the leading message based on the access rate score for the first leading message term and the access rate score for the second leading message term.

6. The system of claim 1, wherein the processing circuitry is configured to determine the access rate score for the first leading message term based on the historical data by being configured to:

determine a first frequency at which consumers accessed electronic communications including the first leading message term and not including a second leading message term of the leading message;
determine a second frequency at which consumers accessed electronic communications including the second leading message term and not including the first leading message term;
determine an attribution score for the first leading message term based at least in part on the first and second frequencies; and
determine the access rate score for the first leading message term based at least in part on the attribution score.

7. The system of claim 1, wherein the processing circuitry is configured to determine the access rate score for the first leading message term based on the historical data by being configured to:
determine an average access rate for the first leading message term;
determine a first number of electronic communications including the first leading message term that resulted in an access rate greater than the average access rate;
determine a second number of electronic communications including the first leading message term that resulted in an access rate less than the average access rate;
determine an occurrence count for the first leading message term based on a difference between the first number of electronic communications and the second number of electronic communications; and
determine the access rate score for the first leading message term based at least in part on the occurrence count.

8. The system of claim 1, wherein the processing circuitry is further configured to:
provide, to a consumer device, a second electronic communication including:
a second leading message that further includes at least a portion of the plurality of terms of the second updated leading message; and
the trailing impression portion;
receive access data from the consumer device indicating that the trailing impression portion has been accessed; and
generate, based on the received access data, the historical data indicating the frequency at which consumers accessed the trailing impression portion for electronic communications including the at least a portion of the plurality of terms.

9. The system of claim 1, wherein the processing circuitry is configured to determine the predicted access rate for the leading message by being configured to determine the predicted access rate based at least in part on leading message metadata of the leading message.

10. The system of claim 1, wherein the attribution score for each of the terms in each of the updated leading messages represents the predicted access rate score for each of the respective terms that is programmatically processed so as to isolate the predicted access rate score from being skewed by one or more distinct predicted access rate scores associated with one or more other terms defining at least a portion of the updated leading message.

11. The system of claim 1, wherein the leading message matrix is defined at least in part by a leading message term count of the corresponding updated leading message, the leading message term count being based at least in part on the plurality of terms of the corresponding updated leading message.

12. A machine-implemented method for programmatically generating an electronic communication, comprising:
receiving, by processing circuitry of an apparatus and from a user input device in communication with the processing circuitry, a leading message including a plurality of leading message terms, wherein the leading message is an email subject;
determining, by the processing circuitry, an access rate score for a first leading message term of the plurality of leading message terms based on historical data indicating frequencies at which consumers accessed electronic communications including leading message terms and frequencies at which consumers accessed a trailing impression portion included within the accessed electronic communications, wherein the accessed electronic communications include emails each indicating one or more promotions, and wherein the trailing impression portion is a body of the email;
accessing the historical data from a non-transitory memory;
determining, by the processing circuitry, a predicted access rate for the leading message based at least in part on the access rate score for the first leading message term, wherein the predicted access rate for the leading message indicates a rate at which consumers are predicted to open an email including the leading message as the email subject;
accessing, by the processing circuitry, a previously generated predicted access rate threshold;
determining, by the processing circuitry, whether the predicted access rate satisfies the predicted access rate threshold; and
in response to determining that the predicated access rate fails to satisfy the predicted access rate threshold, and by the processing circuitry:
generating updated leading messages as possible substitutes for the leading message, each updated leading message comprising a plurality of terms;
determining predicted access rates for each of the updated leading messages based on a plurality of predicted access rate scores, each of the plurality of predicted access rate scores corresponding to a respective term of the plurality of terms of each of the updated leading messages, by:
deriving the plurality of predicted access rate scores corresponding respectively to each term of the plurality of terms of the corresponding updated leading message by:
generating a leading message matrix,
generating a selection matrix based on the leading message matrix,
generating an iterative leading message matrix based on leading message matrix and the selection matrix, and
calculating an attribution score for each term of the plurality of terms in each of the updated leading messages by iterating through the iterative leading message matrix, wherein each attribution scores represented by the iterative leading message matrix converges upon a value that corresponds with measured access rates of the terms of the updated leading messages, but having an influence of connected leading message terms programmatically removed or reduced,
wherein each of the plurality of predicted access rate scores corresponding, respectively, to each of the plurality of terms is based at least in part on the respective attribution score for the corresponding term of the plurality of terms;
determining a selected updated leading message having the highest determined predicted access rate of the updated leading messages, wherein the selected updated leading message is an updated email subject;
generating the electronic communication including the selected updated leading message; and
transmitting the electronic communication to the user input device.

13. The method of claim 12, wherein determining the access rate score for the first leading message term based on the historical data further includes determining a frequency at which consumers accessed electronic communications including the first leading message term.

14. The method of claim 12, wherein determining the access rate score for the first leading message term based on the historical data further includes:
determining one or more related leading message terms related to the first leading message term;
determining, based on the historical data, an access rate score for each of the one or more related leading message terms; and
determining an estimated access rate score for the first leading message term as the access rate score for the first leading message term based on the access rate score for each of the one or more related leading message terms.

15. The method of claim 14, wherein determining the one or more related leading message terms related to the first leading message term includes:
determining that the first leading message term is different from the leading message terms indicated by the historical data;
determining a similarity score between the first leading message term and one or more leading message terms of the historical data; and
determining the one or more related leading message terms based on the similarity score between the first leading message term and the leading message terms indicated by the historical data.

16. The method of claim 12, wherein determining the predicted access rate for the leading message further includes:
determining an access rate score for a second leading message term based on historical data indicating frequencies at which consumers accessed electronic communications including at least the second leading message term; and
determining the predicted access rate for the leading message based on the access rate score for the first leading message term and the access rate score for the second leading message term.

17. The method of claim 12, wherein determining the access rate score for the first leading message term based on the historical data further includes:
determining a first frequency at which consumers accessed electronic communications including the first leading message term and not including a second leading message term of the leading message;

determining a second frequency at which consumers accessed electronic communications including the second leading message term and not including the first leading message term;

determining an attribution score for the first leading message term based at least in part on the first and second frequencies; and determining the access rate score for the first leading message term based at least in part on the attribution score.

18. The method of claim 12, wherein determining the access rate score for the first leading message term based on the historical data further includes:

determining an average access rate for the first leading message term;

determining a first number of electronic communications including the first leading message term that resulted in an access rate greater than the average access rate;

determining a second number of electronic communications including the first leading message term that resulted in an access rate less than the average access rate;

determining an occurrence count for the first leading message term based on a difference between the first number of electronic communications and the second number of electronic communications; and determining the access rate score for the first leading message term based at least in part on the occurrence count.

19. The method of claim 12 further comprising:

providing, to a consumer device, a second electronic communication including:

a second leading message that further includes at least a portion of the plurality of terms of the selected updated leading message term; and the trailing impression portion;

receiving access data from the consumer device indicating that the trailing impression portion has been accessed; and generating, by the processing circuitry and based on the received access data, the historical data indicating a frequency at which consumers accessed the trailing impression portion for electronic communications including the at least a portion of the plurality of term.

20. The method of claim 12, wherein determining the predicted access rate for the leading message further includes determining the predicted access rate based at least in part on leading message metadata of the leading message.

21. The method of claim 12, wherein the attribution score for each of the terms in each of the updated leading messages represents the predicted access rate score for each of the respective terms that is programmatically processed so as to isolate the predicted access rate score from being skewed by one or more distinct predicted access rate scores associated with one or more other terms defining at least a portion of the updated leading message.

22. The method of claim 12, wherein the leading message matrix is defined at least in part by a leading message term count of the updated leading message, the leading message term count being based at least in part on the plurality of terms of the corresponding updated leading message.

23. A computer program product comprising a non-transitory computer readable storage medium and computer program instructions stored therein, the computer program instructions comprising program instructions for:

receiving, by processing circuitry and from a user input device in communication with the processing circuitry, a leading message including a plurality of leading message terms, wherein the leading message is an email subject;

determining, by the processing circuitry, an access rate score for a first leading message term of the plurality of leading message terms based on historical data indicating frequencies at which consumers accessed electronic communications including leading message terms and frequencies at which consumers accessed a trailing impression portion included within the accessed electronic communications, wherein the accessed electronic communications include emails each indicating one or more promotions, and wherein the trailing impression portion is a body of the email;

accessing the historical data from a non-transitory memory; and determining, by the processing circuitry, a predicted access rate for the leading message based at least in part on the access rate score for the first leading message term, wherein the predicted access rate for the leading message indicates a rate at which consumers are predicted to open an email including the leading message as the email subject;

accessing, by the processing circuitry, a previously generated predicted access rate threshold;

determining, by the processing circuitry, whether the predicted access rate satisfies the predicted access rate threshold; and in response to determining that the predicated access rate fails to satisfy the predicted access rate threshold, and by the processing circuitry:

generating updated leading messages as possible substitutes for the leading message, each updated leading message comprising a plurality of terms;

determining predicted access rates for each of the updated leading messages based on a plurality of predicted access rate scores, each of the plurality of predicted access rate scores corresponding to a respective term of the plurality of terms of each of the updated leading messages, by:

deriving the plurality of predicted access rate scores corresponding respectively to each term of the plurality of terms of the corresponding updated leading message by:

generating a leading message matrix, generating a selection matrix based on the leading message matrix, generating an iterative leading message matrix based on leading message matrix and the selection matrix, and calculating an attribution score for each term of the plurality of terms in each of the updated leading messages by iterating through the iterative leading message matrix, wherein each attribution scores represented by the iterative leading message matrix converges upon a value that corresponds with measured access rates of the terms of the updated leading messages, but having an influence of connected leading message terms programmatically removed or reduced, wherein each of the plurality of predicted access rate scores corresponding, respectively, to each of the plurality of terms is based at least in part on the respective attribution score for the corresponding term of the plurality of terms;

determining a selected updated leading message having the highest determined predicted access rate of the updated leading messages, wherein the selected updated leading message is an updated email subject;

generating an electronic communication including the selected updated leading message; and transmitting the electronic communication to the user input device.

24. The computer program product of claim 23, wherein the attribution score for each of the terms in each of the updated leading messages represents the predicted access rate score for each of the respective terms that is programmatically processed so as to isolate the predicted access rate score from being skewed by one or more distinct predicted access rate scores associated with one or more other terms defining at least a portion of the updated leading message.

25. The computer program product of claim 23, wherein the leading message matrix is defined at least in part by a leading message term count of the updated leading message, the leading message term count being based at least in part on the plurality of terms of the corresponding updated leading message.

\* \* \* \* \*